United States Patent [19]

Higashimoto

[11] Patent Number: 4,881,458
[45] Date of Patent: Nov. 21, 1989

[54] METHOD OF AND APPARATUS FOR DISPERSING AND DISTRIBUTING A PICKLE IN RAW MEAT

[75] Inventor: Tsuyoshi Higashimoto, Ikoma, Japan

[73] Assignee: Higashimoto Kikai Co., Ltd., Japan

[21] Appl. No.: 161,903

[22] Filed: Feb. 29, 1988

[30] Foreign Application Priority Data

Mar. 5, 1987 [JP] Japan .................................. 62-51084
Mar. 5, 1987 [JP] Japan .................................. 62-51085

[51] Int. Cl.$^4$ .............................................. A23B 4/00
[52] U.S. Cl. ......................................... 99/533; 17/25; 99/535
[58] Field of Search ................. 99/532, 533, 535, 516, 99/487; 17/25, 51

[56] References Cited

U.S. PATENT DOCUMENTS

| | | | |
|---|---|---|---|
| 3,413,681 | 12/1968 | Manaster | 17/25 |
| 3,719,504 | 3/1973 | Greenspan et al. | 17/25 X |
| 4,216,566 | 8/1980 | Bettcher | 17/25 |
| 4,455,928 | 6/1984 | Townsend | 99/533 |

*Primary Examiner*—Timothy F. Simone
*Attorney, Agent, or Firm*—Kirschstein, Ottinger, Israel & Schiffmiller

[57] ABSTRACT

Raw meat having a pickle solution injected thereinto is intermittently fed along the upper surface of a conveyor, and a press block is lowered toward the raw meat on the conveyor each time the raw meat is fed. Accordingly, the raw meat is compressed by the press block to forcibly disperse the pickle solution in the raw meat and uniformly distribute the pickle solution throughout the raw meat.

7 Claims, 3 Drawing Sheets

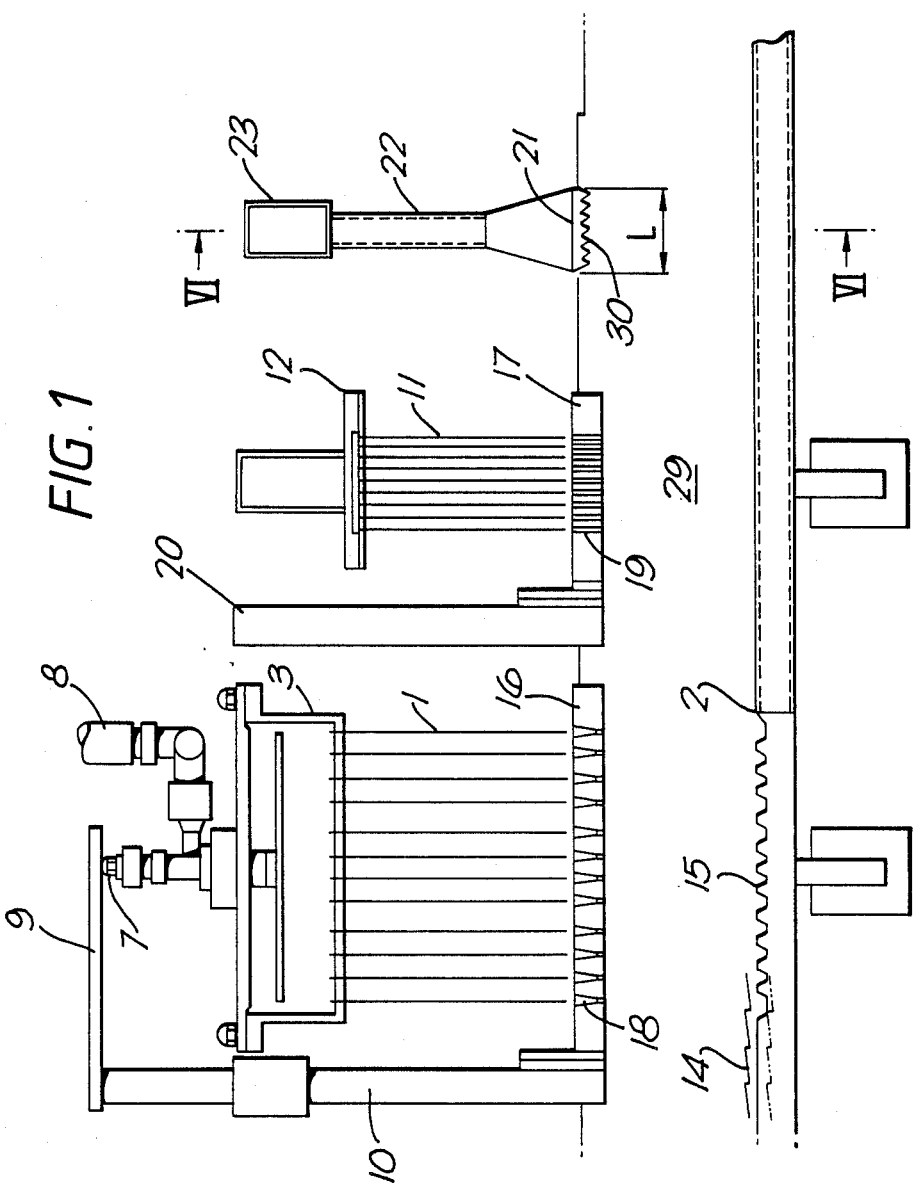

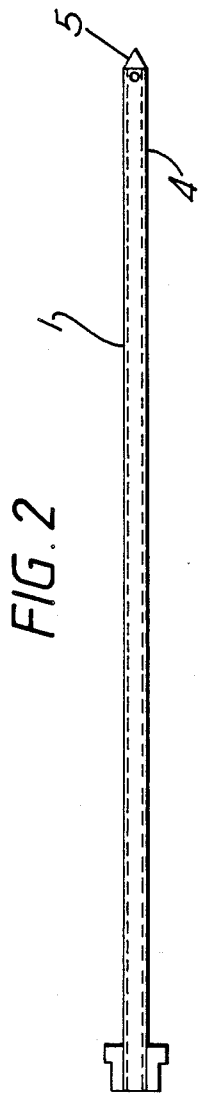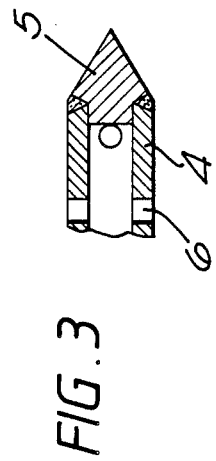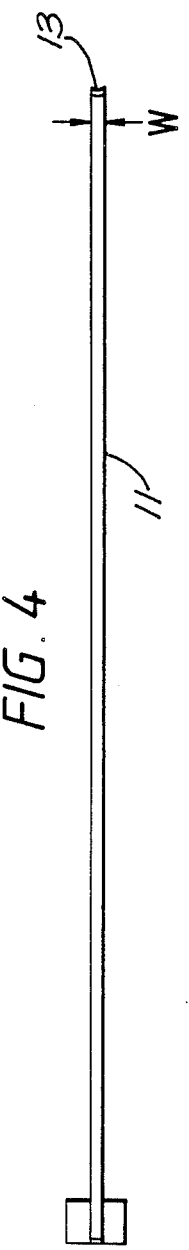

METHOD OF AND APPARATUS FOR DISPERSING AND DISTRIBUTING A PICKLE IN RAW MEAT

FIELD OF THE INVENTION

The invention relates to a method of dispersing and distributing a pickle in raw meat after the pickle has been injected into the raw meat, and an apparatus therefor.

PRIOR ART

In the processing of ham and the like, a pickle injector has been generally used for injecting a pickle into raw meat prior to salting the latter in a salting tank. This is intended to reduce the salting period of the raw meat and improve the color development and preservability of the raw meat.

The pickle injector has a number of pickle injecting needles, which are disposed above a raw meat feed conveyor. Raw meat is intermittently fed along the upper surface of the conveyor to the position of the injection needles. Each time raw meat is fed, the injection needles are lowered toward the raw meat on the conveyor and a pickle is fed to the injection needles. Thus, the injection needles can be thrusted into the raw meat to inject the pickle into the raw meat.

To improve the effect obtained by the pickle injected into raw meat, the pickle should be uniformly dispersed and distributed throughout the raw meat. However, according to the quality of raw meat, a pickle can not always be uniformly distributed throughout the raw meat.

SUMMARY OF THE INVENTION

Accordingly, an object of the invention is to provide a novel and improved method of dispersing and distributing pickle in raw meat and an apparatus therefor, in which after a pickle has been injected into raw meat, the pickle is forcibly dispersed in the raw meat, so that irrespective of the meat quality of raw meat, the pickle is positively dispersed to be uniformly distributed throughout the raw meat.

According to this invention, raw meat having a pickle injected thereinto is intermittently fed along the upper surface of a conveyor. Each time raw meat is fed, a press block or disk is lowered toward the raw meat on the conveyor, so that the raw meat is compressed by the press block and the pickle is forcibly dispersed in the raw meat. Therefore, irrespective of the meat quality of raw meat, the pickle is positively dispersed to be uniformly distributed throughout the raw meat so that the effect obtained by the pickle can be improved.

An apparatus according to this invention preferably has a pair of upright guide walls extending along opposite side edges of the conveyor. Preferably, the press block has a width corresponding to the distance between the guide walls and is disposed above the conveyor. Preferably, the press block has a length corresponding to the feed stroke of the conveyor so that the raw meat is uniformly compressed. The press block may have a length which is twice or three times as great as the feed stroke of the conveyor so as to compress the raw meat twice or three times. The press block preferably has a rectangular bottom surface provided with a number of projections, said projections being in the form of pyramids arranged in a lattice pattern on the entire bottom surface of the press disk.

According to this invention, the pickle dispersion and distribution apparatus is combined with an injector having a number of pickle injecting needles. The apparatus has a raw meat compressing press block, which is disposed downstream of the injection needles. In this injector, each time raw meat is fed, the press block is lowered toward the raw meat on the conveyor, so that the raw meat is compressed by the press block. A number of meat fiber cutting needles are preferably installed between the injection needles and the press block and above the conveyor. Each time raw meat is fed, the cutting needles are lowered toward the raw meat on the conveyor so that they are thrusted into the raw meat and cut the fibers. The meat fiber cutting needles may be installed downstream of the press block and above the conveyor.

BRIEF DESCRIPTION OF THE DRAWINGS

FIG. 1 is a side view showing a pickle injector which embodies the invention;

FIG. 2 is a side view of a pickle injecting needle in FIG. 1;

FIG. 3 is an enlarged sectional view of the injecting needle of FIG. 2:

FIG. 4 is a front view of a raw meat fiber cutting needle in FIG. 1:

FIG. 5 is a side view of the cutting needle of FIG. 4;

DESCRIPTION OF THE PREFERRED EMBODIMENT

Figure 6:
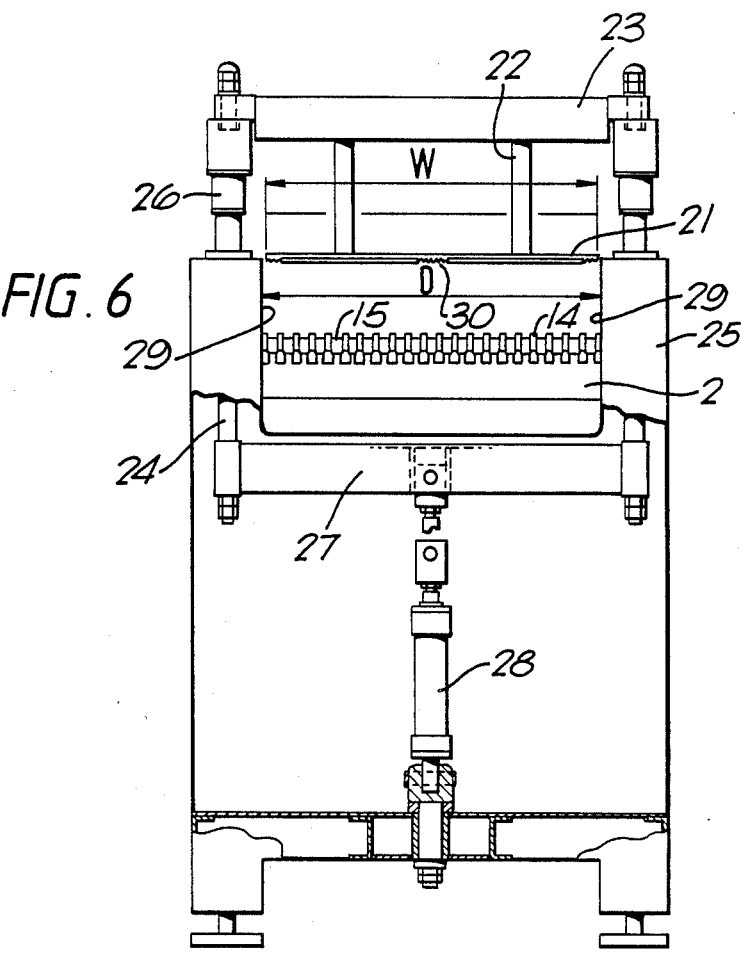
FIG. 6 is a sectional view taken along the line VI—VI in FIG. 1, showing a pickle dispersion and distribution apparatus.

Referring to FIG. 1, an injector having pickle injecting needles 1 is shown. The injecting needles 1 are adapted to inject a pickle into raw meat and they are disposed above a raw meat feed conveyor 2, extend vertically and are attached to a pickle injection head 3. As shown in FIGS. 2 and 3, each injecting needle 1 comprises a cylindrical hollow pipe 4 and a tip 5, said tip 5 being welded or press-fitted to the open end of the hollow pipe 4, thereby sealing the latter. A plurality of pickle spout holes 6 are formed in the peripheral wall of the hollow pie adjacent the tip 5, said tip 5 being in the form of a triangular pyramid.

The injection head 3 has a valve stem 7 and is connected to a pickle solution supply tube 8. The valve stem 7 is adapted to cut off the pickle from the supply tube 8. Further, the injection head 3 is connected to and supported by a hydraulic cylinder, with a changeover valve provided in the hydraulic circuit for the hydraulic cylinder, said changeover valve being connected to a control device. The injection head 3 is driven by the control device and hydraulic cylinder to lower and lift the injection needles 1 integrally with the injection head 3 and contact the valve stem 7 with a stopper 9, the valve stem 7 being operated by the stopper 9. The stopper 9 is fixed to a pillar 10.

Further, this injector has a number of meat fiber cutting needles 11. The cutting needles 11 are adapted to cut the fibers of raw meat to soften them to a suitable degree, and they are installed above the raw meat feed conveyor 2, vertically extend and are attached to a meat fiber cutting head 12. Further, as shown in FIGS. 4 and 5, a cutting edge 13 is formed on the tip of each cutting needle 11, said cutting edge 13 having a given width w and being capable of cutting the fibers of raw meat. As in the case of the injection head 3, the cutting head 12 is connected to a hydraulic cylinder having a changeover valve connected to the control device. The cutting head 12 is driven by the control device and hydraulic cylinder to lower and lift the cutting needles 11 integrally with the cutting head 12.

The conveyor 2 is adapted to intermittently feed raw meat and it comprises a movable plate 14 and a fixed plate 15, said movable plate 15 being designed so that it rises above the fixed plate 14, advances horizontally, lowers below the fixed plate 14, and retracts horizontally, this series of motions being repeated. Therefore, by the movable plate 14, the raw meat can be lifted and horizontally and intermittently fed over a given distance each time. Further, this injector has a pair of raw meat holding plates 16 and 17. The holding plate 16 has injection needle receiving holes 18 and it is disposed at the position of the injection needles 1 and fixed to the pillar 10. The holding plate 17 has cutting needle receiving holes 19 and it is disposed at the position of the cutting needles 11 and fixed to a pillar 20.

Further, this injector has a pickle dispersion and distribution apparatus comprising a raw meat compressing press block or disk 21. The press block 21 is adapted to compress the raw meat on the conveyor 2 and it has a predetermined width and a length L corresponding to the feed stroke of the conveyor 2 and is installed downstream of the injection needles 1. In this embodiment, the cutting needles 11 are disposed between the injection needles 1 and the press block 21, and the press block 21 is disposed downstream of the cutting needles 11.

As shown in FIG. 6, the press block 21 is fixedly connected to a connecting web 22 and to a press head 23, and the press head 23 is connected to and supported by a pair of rods 24. The rods 24 extend vertically and are inserted in and slidably guided by guide metals installed in the frame 25 of the injector. Further, three-stage bellows 26 are attached to the press head 23 and to the frame 25, and the rods 24 are covered with the bellows 26. Further, a changeover valve for a hydraulic cylinder 28 is connected to the control device so that each time raw meat is fed, the press head 23 is driven by the control device and the hydraulic cylinder 28 to lower and lift the press block 21 integrally with the press head 23.

The frame 25 has a pair of upright guide walls 29 extending along opposite side edges of the conveyor 2. The conveyor 2 is disposed between the guide walls 29. The press block 21 has a width W corresponding to the distance D between the guide walls 29 and is disposed above the raw meat feed conveyor 2.

Figure 7:
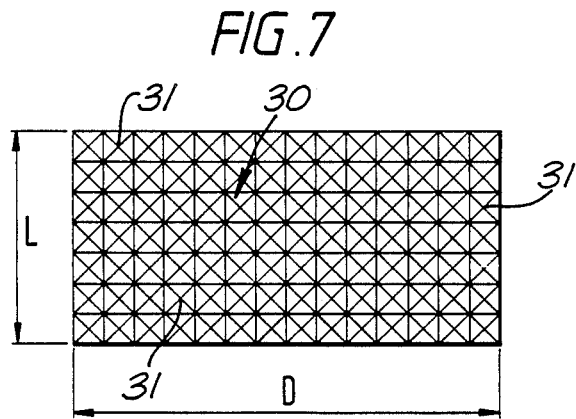
FIG. 7 is a bottom view of a press block in FIG. 6.

As shown in FIG. 7, the press block 21 has a rectangular bottom surface 30. A number of projections 31 are formed on the bottom surface 30 of the press disk 21. The projections 31 are in the form of pyramids arranged in a lattice pattern on the entire bottom surface 30.

In this pickle injector, raw meat is guided by the guide walls 29 of the frame 25 and intermittently fed along the upper surface of the conveyor 2 to the position of the injection needles 1. Each time the raw meat is fed, the injection head 3 is driven by the hydraulic cylinder to lower injection needles 1 integrally with the injection head 3 toward the raw meat on the conveyor 2. Therefore, the valve stem 7 of the injection head 3 leaves the stopper 9, and the pickle passes through the supply tube 8 and is fed to the injection head 3 and introduced into the injection needles 1. Thereafter, the injection needles 1 are inserted into the receiving holes 18 of the holding plate 16. Therefore, the injection needles 1 are thrusted into raw meat; thus, the pickle can be injected into the raw meat. Thereafter, the injection needles 1 and injection head 3 are lifted to their original positions. Therefore, the valve stem 7 of the injection head 3 contacts the stopper 9, and the pickle from the supply tube 8 is cut off by the valve stem 7.

After the injection of the pickle, the raw meat is fed to the position of the cutting needles 11. Each time the raw meat is fed, the cutting head 12 is driven by the hydraulic cylinder to lower the cutting needles 11 integrally with the cutting head 12 so that the cutting needles 11 are inserted into the receiving holes 19 of the holding plate 17. Therefore, the cutting edges 13 of the cutting needles 11 are thrusted into the raw meat, so that the fibers of the raw meat are cut. As a result, the raw meat is softened to a suitable degree. Thereafter, the cutting needles 11 and the cutting head 12 are lifted to their original positions.

Further, after the cutting of the fibers of the raw meat, the softened raw meat is fed to the position of the press block 21. Each time the raw meat is fed, the press head 23 is driven by the hydraulic cylinder 28 to lower the press block 21 integrally with the press head 23 toward the raw meat on the conveyor 2. Therefore, the bottom surface 30 of the press block 21 comes in contact with and is pressed against the raw meat; thus, the raw meat is compressed by the press block 21. Therefore, the pickle is forcibly dispersed in the raw meat.

Since the press block 21 has a length L corresponding to the feed stroke of the conveyor 2, and each time the raw meat is fed, it is compressed by the press block 21, the whole raw meat can be uniformly compressed.

The individual processing steps described above are successively repeated. The raw meat is intermittently fed along the upper surface of the conveyor 2, passing through the position of the injection needles 1, the position of the cutting needles 11 and the position of the press block 21, and are discharged downstream.

Therefore, concerning the raw meat in this injector, after the injection of the pickle, the raw meat can be compressed to forcibly disperse the pickle in the raw meat. Furthermore, when the raw meat is compressed by the press block 21, the guide walls 29 extend along the opposite side edges of the conveyor 2 and the raw meat is restrained on the conveyor 2 and between the guide walls 29. Moreover, the press block 21 whose width W corresponds to the distance D between the guide walls 29 is lowered, with its bottom surface 30 urged against the raw meat on the conveyor 2. Therefore, between the guide walls 29, the bottom surface 30 of the press disk 21 is uniformly urged against the raw meat. Further, the projections 31 on the bottom surface 30 bite into the raw meat, so that there is no slippage occurring between the bottom surface 30 and the raw meat. Therefore, the raw meat is conveniently compressed to effectively disperse the pickle in the raw meat.

Therefore, irrespective of the quality of the raw meat, when the raw meat is compressed by the press block 21, the pickle is positively dispersed to be uniformly distributed throughout the raw meat. Therefore, the effect of the pickle with respect to the raw meat can be improved.

Further, in this injector, not only is the raw meat compressed by the press block 21 but also the fibers of the raw meat are cut by the cutting needles 11, so that the raw meat is softened to a suitable degree. Therefore, the pickle can be smoothly dispersed and distributed. It can be perfectly dispersed and distributed throughout the raw meat.

The press block 21 may be installed between the injection needles 1 and the cutting needles 11, and the cutting needles 11 and the cutting head 12 may be installed downstream of the press block 21. In some cases, the cutting needles 11 and the cutting head 12 may be eliminated. Further, a plurality of cutting heads 12 and a plurality of press blocks or disks 21 may be installed downstream of the injection head 3, and the press blocks 21 and cutting heads 12 may be alternately arranged.

Further, as the press driving mechanism and cutting needle driving mechanism, air cylinders and the like may be used instead of hydraulic cylinders to drive the press block 21 and cutting needles 11. Further, instead of the length L corresponding to the stroke of the conveyor 2, twice or three times said length may be selected as the length of the press block 21. The use of a press block which is twice or three times as long makes it possible to compress raw material meat masses twice or three times so as to thereby massage the same.

Additionally, a pickle dispersion and distribution apparatus having a press block 21 may be specially provided, separated from the injector and made independent. In the apparatus separated from the injector, by providing a conveyor 2, a press block 21, a press head 23, a hydraulic cylinder 28 and upright guide walls 29, like those used in the above embodiment, charging raw meat into the apparatus after injecting a pickle into the raw meat to intermittently feed it along the upper surface of the converyor 2, and compressing the raw meat by the press block 21, the pickle can be forcibly dispersed in the raw meat with the same functions and advantages attained.

As has been described so far, according to this invention, each time raw meat is fed, the press block 21 is lowered toward the raw meat on the conveyor 2 so that the raw meat is compressed by the press block 21, whereby the pickle can be forcibly dispersed in the raw meat. Therefore, the effect of the pickle with respect to the raw meat can be improved. Further, not only is the raw meat compressed by the press block 21, but also the fibers of the raw meat are cut by the cutting needles 11 so that the raw meat is softened to a suitable degree, whereby the pickle can be smoothly dispersed and distributed throughout the raw meat.

What is claimed is:

1. An apparatus for distributing and dispersing a pickle solution throughout raw meat, comprising:
   (a) a conveyor operative for intermittantly feeding along a feed direction successive masses of raw meat containing a pickle solution, said conveyor having opposite sides spaced apart along a transverse direction that extends generally normally of the feed direction;
   (b) a pair of guide walls at, and extending upwardly of, the opposite sides of the conveyor, said guide walls being spaced apart along the transverse direction by a predetermined distance and bounding with the conveyor a channel in and along which the successive raw meat masses containing the pickle solution are confined and guided;
   (c) a movable press block having a transverse width dimension corresponding to said predetermined distance and situated above the conveyor for reciprocal movement toward and away from the conveyor and into and out of the channel, said press block having a rectangular bottom surface formed with a number of projections, said projections being in the form of pyramids arranged in a lattice pattern on the entire bottom surface of said press block, said projections being adapted to bite into said raw meat masses to resist slippage occurring between the bottom surface of said press block and said raw meat masses; and
   (d) drive means for reciprocally moving the press block between a remote position in which the press block is disposed remotely from the raw meat masses in the channel, and a pressing position in which the press block enters the channel and compresses the raw meat masses confined in the channel between the guide walls to forcibly disperse and uniformly distribute the pickle solution throughout the raw meat masses.

2. An apparatus for distributing and dispersing a pickle solution throughout raw meat, comprising:
   (a) a conveyor operative for intermittently feeding along a feed direction successive masses of raw meat, said conveyor having opposite sides spaced apart along a transverse direction that extends generally normally of the feed direction;
   (b) a pair of guide walls at, and extending upwardly of, the opposite sides of the conveyor, said guide walls being spaced apart along the transverse direction by a predetermined distance and bounding with the conveyor a channel in and along which the successive raw meat masses are confined and guided;
   (c) a plurality of pickle injection needles disposed above said conveyor, and thrust into the raw meat masses for injecting a pickle solution;
   (d) a movable press block disposed downstream along the feed direction of said injection needles and having a transverse width dimension corresponding to said predetermined distance and situated above the conveyor for reciprocal movement toward and away from the conveyor and into and out of the channel, said press block having a number of projections extending from a bottom surface; and
   (e) drive means for reciprocally moving the press block between a remote position in which the press block is disposed remotely from the raw meat masses in the channel, and a pressing position in which the press block enters the channel and compresses the raw meat masses confined in the channel between the guide walls to forcibly disperse and uniformly distribute the pickle solution throughout the raw meat masses.

3. An apparatus as set forth in claim 2, wherein said press block has a length corresponding to a feed stroke of said conveyor to uniformly compress said raw meat masses.

4. An apparatus as set forth in claim 2, wherein said press block has a length a plurality of times as great as a feed stroke of said conveyor to compress said raw meat masses said plurality of times so as to thereby massage the same.

5. A pickle solution injector having a feed conveyor for intermittently feeding along a feed direction successive masses of raw meat in successive feed strokes, and a number of pickle injection needles disposed above said feed conveyor, said injection needles being thrust into said raw meat masses for each feed stroke, so as to inject a pickle solution into said raw meat masses, said pickle solution injector comprising:

a raw meat compressing press block disposed downstream along the feed direction of said injection needles and above said conveyor, and a press block driving mechanism for lowering said press block toward the raw meat masses on said conveyor so that said raw meat masses are compressed by said press block.

6. A pickle solution injector as set forth in claim 5, and further comprising:

a number of raw meat fiber cutting needles disposed between said injection needles and said press block, as considered along the feed direction, and above said conveyor, and a cutting needle driving mechanism for lowering said cutting needles toward the raw meat masses on said conveyor for each feed stroke so that said cutting needles are thrust into said raw meat masses to cut the fibers thereof.

7. A pickle solution injector as set forth in claim 5, and further comprising:

a number of raw meat fiber cutting needles disposed downstream along the feed direction of said press block and above said conveyor, and a cutting needle driving mechanism for lowering said cutting needles toward the raw meat masses on said conveyor for each feed stroke so that said cutting needles are thrust into said raw meat masses to cut the fibers thereof.

* * * * *